2,802,272
Patented Aug. 13, 1957

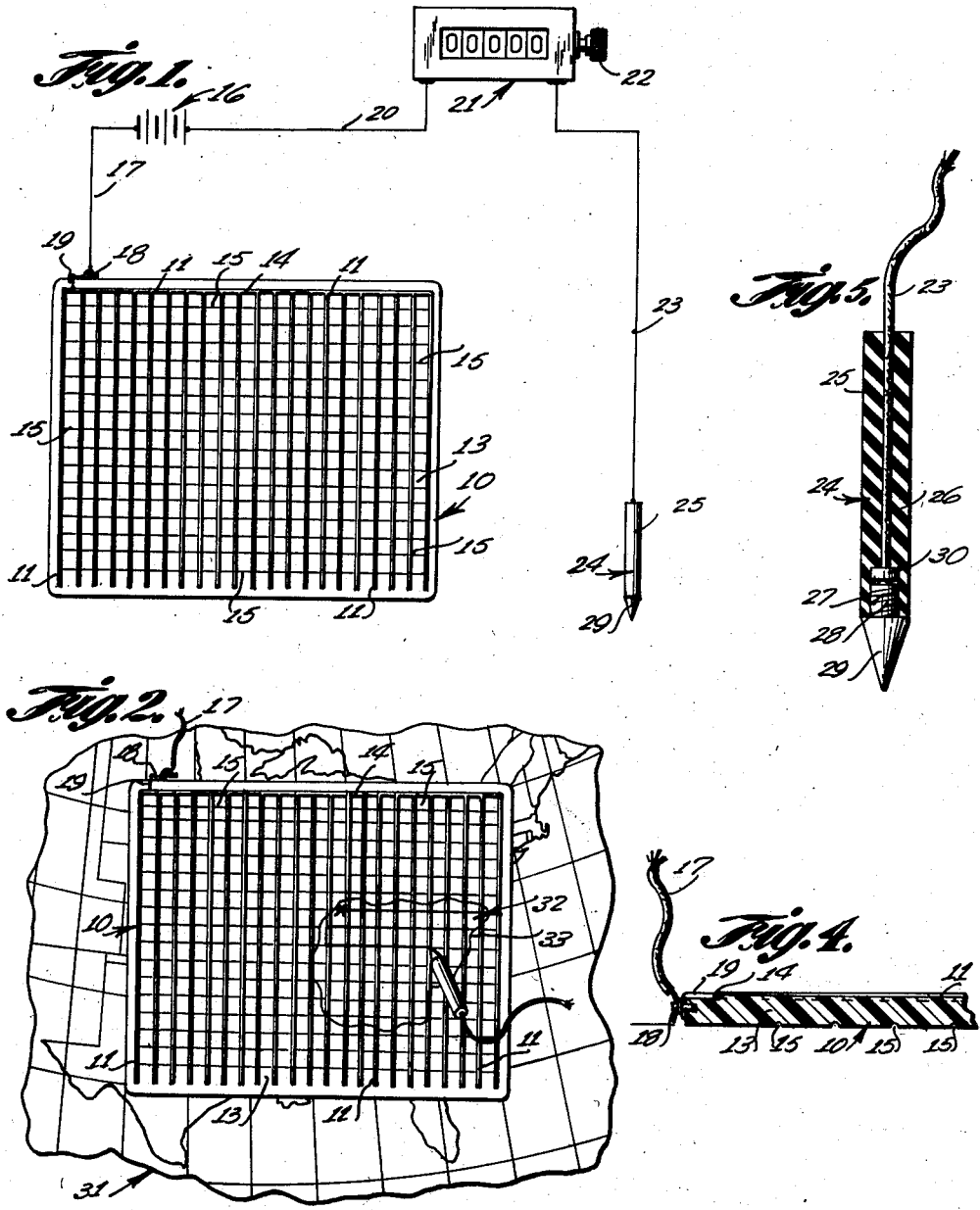

2,802,272

AREA CALCULATOR

Warren R. Martin and Roy L. Kuykendall,
Albuquerque, N. Mex.

Application April 27, 1954, Serial No. 425,988

3 Claims. (Cl. 33—123)

This invention relates to a method of and apparatus for measuring the area of plane surfaces such as portions of maps, drawings and the like.

The object of the invention is to provide a method of and apparatus for measuring the area of irregular surfaces whereby such measurements can be accomplished with a high degree of accuracy and ease.

Another object of the invention is to provide an area measuring means which is more accurate than a ruler or planimeter, the assembly of the present invention including a transparent grid, a source of electricity, a counter and a marking tool.

A further object of the invention is to provide an area calculator which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view of the area calculating apparatus, constructed according to the present invention.

Figure 2 is an enlarged plan view of the grid showing the grid being used for calculating the area of a predetermined section of a map.

Figure 3 is a sectional view taken through the transparent grid and showing a portion thereof.

Figure 4 is a sectional view taken on the line 4—4 of Figure 3.

Figure 5 is a longitudinal sectional view taken through the marking tool.

Referring in detail to the drawings, the numeral 10 designates a transparent grid or base which may have a rectangular shape, and the grid 10 may be made of any suitable material. The grid 10 includes a body portion 13, Figure 3, and extending along the upper surface of the grid 10 and secured thereto is a plurality of spaced parallel conductors 11 which may be wires, Figure 3. The conductors 11 may be seated in grooves 12 in the upper surface of the grid 10 as shown in Figure 3.

Arranged on the opposite side of the grid 10 from the conductors 11 is a plurality of guide lines 15 which may take the shape of grooves or the like that may be etched in the surface of the grid. The guide lines 15 are arranged in spaced parallel relation with respect to each other, and the set of guide lines 15 are arranged at right angles with respect to the conductors 11.

The numeral 16 designates a source of supply of electrical energy, Figure 1, and the source of supply of electrical energy 16 has a line 17 leading therefrom to a bracket 18. The bracket 18 is arranged contiguous to the grid 10, and a wire or line 19 connects the bracket 18 to a wire 14. The wire 14 is electrically connected to all of the conductors 11, Figure 2.

A wire 20 connects the source of energy 16 to a counter 21 which may be of conventional construction, and the counter 21 may be provided with a reset button 22. A wire or line 23 leads from the counter 21 to a marking tool 24 and the marking tool 24 may have the construction shown in Figure 5. Thus, the marking tool 24 may include a handle 25 of insulating material such as plastic, and extending longitudinally through the handle 25 is a passageway 26 through which projects the line 23. The passageway 26 terminates or communicates with an enlarged chamber 27, and a bushing 28 is arranged in threaded engagement with the chamber 27. The bushing 28 has connected thereto a pointer or tip 29, and the bushing 28 is arranged in contact with a terminal 30 which is connected to the line 26. The marking tool 24 has an electrical contact element near its tip and the electrical contact element is electrically connected to the counter 21.

From the foregoing it is apparent that there has been provided a method of and apparatus for measuring the area of plane surfaces such as portions of a map 31 as shown in Figure 2. Thus, the heavy lines in Figure 2 represent an area 32 which can be measured by means of the present invention. Often areas are so irregular in shape that conventional measuring devices such as rulers, planimeters and the like are too inaccurate or else the cost of such devices are too prohibitive but with the present invention these disadvantages are overcome.

In previous devices for measuring certain map areas and the like to find acreage of a specific area, or the relative areas of two or more different areas, previously a transparent grid with superimposed dots spaced distances of equal amounts apart were placed on the area to be measured and the dots that fell in the specific area were counted. Thus, each dot was given a certain acreage value depending upon the scale of the map, and the area determined by the number of dots that fell inside the boundary but this method is time consuming and hard on the operator's eyes.

The present invention includes a transparent grid 10 that has parallel conducting lines 11 and these lines are used in lieu of the dots used in the old method. There is further provided guide lines 15 which may be etched in the lower surface of the grid 10 and the guide lines 15 run at right angles to the conducting lines 11. There is further provided the magnetic counter 21 which may have the reset knob 22 and the marking tool 24 which is capable of carrying an electric current and which may also be constructed so that it leaves an easily discernable mark. These various parts may be interconnected together by suitable wires as shown in Figure 1.

To use the present invention the transparent grid 10 is placed upon the surface such as the map 31 to be measured and the map or drawing may contain regular or irregular boundaries. The specific bounded area within the map or drawing that is to be measured such as the area 32 can easily be seen through the transparent grid 10. The marking tool 24 is then gripped in the hand and placed in the uppermost left hand corner as for example at the starting point 33. The tool 24 is then drawn to the right using the guide lines 15 as the traversing control and the marking tool 24 when drawn across a conducting line 11 completes the circuit and activates or actuates the counter 21 one time for each conducting line 11 crossed. The marking tool 24 not only completes the circuit when it contacts the conducting line 11 but may also be constructed so that it leaves an easily removable mark on the non-conducting transparent grid 10. When the tool, that is the tip 29 of the tool 24 reaches the right hand boundary line of the area to be measured, see Figure 2, the operator moves the tool downward to the next parallel guide line 15 and the process is repeated from right to left using that guide line as the traversing control. These traverses are continued until the whole area to be measured has been covered. The mark that the tool 24 leaves on the grid 10 enables the operator to ascertain which areas have been covered and also permits the operator to stop measuring at any time and later on continue without losing the place. After the areas to be measured are all completed, or after the grid has been completely covered, the marking lines may be easily removed and the grid 10 used over again on a different area or stored for future use. The actual area in acres, inches or miles can be computed or determined by referring to the map or drawing scale.

The magnetic counter 21 can be either a reset button type or a straight counter without reset button and the numeral 22 indicates the reset button. Also, more than one counter can be used in the circuit by placing the additional counter in parallel. When two or more counters are being used, one counter can be used to measure a small area on the map while the other could be used to sum up the total of all the areas. The electrical counters can be made to function on A. C. or D. C. current and at varying voltages.

The grid 10 can be made of fully transparent plastic material or can have a slightly frosted surface in order to enable the marking tool 24 to function better. The transparent grid 10 can also be made of window glass or tough transparent tracing paper. The conduction lines 11 on the grid 10 can be made of thin copper or other low resistance conductors embedded in the plastic with only a slight part of the wire exposed, or the wires may be set in grooves cut in the plastic with only a small amount of the wire exposed above the surface of the transparent grid. The conducting lines can also be made of silver paint printed on the transparent grid or the lines could be made of graphite embossed on the transparent grid.

The marking tool 24 may consist of a regular soft pencil that will mark on the grid or it may consist of a pen that will ink a line or a charcoal pencil, or a crayon type pencil that has a wire contact feeler running along the side of the crayon to actuate the counter.

The counter 21 can be operated on either A. C. or D. C. or a battery source. When operated on a battery source the device has an advantage in being used when A. C. is not available and also when operated on battery source the device can be made portable. With the present invention the device will save eyestrain from the operator, as well as speeding up area measurement and stop any confusion resulting from not knowing whether or not an area has been measured off. Also, the operator can stop work at any point and be able to continue later on and there will be no human errors in remembering the numbers of dots, counting and the like.

The calculator grid may be made of silver foil embossed on the transparent grid to provide the conducting lines, and the transparent grid may also be made from auto-positive film on which the conducting lines are placed. The guide lines 15 may be etched on the opposite side of the transparent grid 10 from the conducting lines 11 so that the guide lines 15 are used visually to guide the marking tool. Furthermore, the area calculator of the present invention can be used by engineers to estimate the cubic amount of material needed to fill in, or to be taken out of areas such as road cuts, ditches, hills and the like by the use of diagrams and plans that engineers or workmen have drawn up.

We claim:

1. In an apparatus for measuring the area of plane surfaces, a transparent grid, a plurality of spaced parallel conductors on said grid, a source of electricity connected to said conductors, a counter connected to said source of electricity, and a marking tool having an electrical contact element near its tip, said electrical contact element being electrically connected to said counter.

2. In an apparatus for measuring the area of plane surfaces, a transparent grid, a plurality of spaced parallel conductors on said grid, a source of electricity connected to said conductors, a counter connected to said source of electricity, a marking tool having an electrical contact element near its tip, said electrical contact element being electrically connected to said counter, and guide lines arranged on said grid.

3. In combination, a transparent grid, a plurality of spaced parallel conductors mounted on said grid, there being a plurality of spaced parallel guide lines on said grid arranged at right angles to said conductors, a source of electrical energy connected to said conductors, a counter device connected to said source of electrical energy, and a marking tool having an electrical contact element near its tip, said electrical contact element being electrically connected to said counter device.

References Cited in the file of this patent

UNITED STATES PATENTS

| 741,881 | Bright | Oct. 20, 1903 |
| 1,076,275 | Freeman | Oct. 21, 1913 |

FOREIGN PATENTS

| 10,231 | Great Britain | 1907 |